United States Patent
Ham et al.

(10) Patent No.: US 9,644,518 B2
(45) Date of Patent: May 9, 2017

(54) UREA FILLER NECK AND UREA TANK FOR PREVENTION OF UREA OVERFLOW AND UREA AFTER-TREATMENT SYSTEM WITH OUTSIDE FILLER NECK

(71) Applicants: HYUNDAI MOTOR COMPANY, Seoul (KR); KOREA FUEL-TECH CORPORATION, Anseong-si, Gyeonggi-do (KR)

(72) Inventors: Chang-Ho Ham, Ansan-si (KR); Pil-Seon Choi, Anyang-si (KR); Dong-Myoung Ryoo, Yongin-si (KR); Young-Jae Lim, Anseong-si (KR); Myung-Keun Chae, Anseong-si (KR)

(73) Assignees: Hyundai Motor Company, Seoul (KR); Korea Fuel-Tech Corporation, Anseong-si, Gyeonggi-do (KR)

( * ) Notice: Subject to any disclaimer, the term of this patent is extended or adjusted under 35 U.S.C. 154(b) by 174 days.

(21) Appl. No.: 14/559,433

(22) Filed: Dec. 3, 2014

(65) Prior Publication Data
US 2016/0003122 A1  Jan. 7, 2016

(30) Foreign Application Priority Data
Jul. 7, 2014 (KR) .......................... 10-2014-0084292

(51) Int. Cl.
*F01N 3/28* (2006.01)
*B67D 7/02* (2010.01)
(Continued)

(52) U.S. Cl.
CPC ............ *F01N 3/2896* (2013.01); *B60K 13/04* (2013.01); *B60K 15/03* (2013.01); *B67D 7/0294* (2013.01);
(Continued)

(58) Field of Classification Search
CPC ...... B60K 13/04; B60K 15/03; B60K 15/077; B67D 7/0294; B67D 7/362; B67D 7/42; F01N 3/2066; F01N 3/2896
(Continued)

(56) References Cited

U.S. PATENT DOCUMENTS

| 4,651,889 A | 3/1987 | Uranishi et al. |
| 7,997,306 B2 | 8/2011 | Kobayashi et al. |
| 2013/0306665 A1* | 11/2013 | Eberhardt ............ B60K 15/04 220/746 |

FOREIGN PATENT DOCUMENTS

| EP | 2 665 901 A1 | 11/2013 |
| JP | 2003-252069 A | 9/2003 |

(Continued)

*Primary Examiner* — Timothy L Maust
*Assistant Examiner* — Andrew Schmid
(74) *Attorney, Agent, or Firm* — McDermott Will & Emery LLP (57) ABSTRACT

A urea filler neck for preventing a urea overflow includes a filler housing forming a urea path in which urea flows to a urea tank. An injection gun guide is provided in the filler housing. An end of an injection gun is fixed by the injection gun guide to limit an insertion position of the injection gun inserted into an inlet of the filler housing. An injection gun guide flooding phenomenon is generated, in which urea flowing backward from the urea tank rises to block an air flow in the filler housing being generated in the injection gun guide. A filler housing pressure increasing phenomenon is generated, in which a pressure in the filler housing is increased due to blocking of the air flow by the injection gun guide flooding phenomenon being generated in the injection gun guide.

8 Claims, 5 Drawing Sheets

(51) Int. Cl.
- *B67D 7/36* (2010.01)
- *B67D 7/42* (2010.01)
- *F01N 3/20* (2006.01)
- *B60K 13/04* (2006.01)
- *B60K 15/03* (2006.01)

(52) U.S. Cl.
CPC ............... *B67D 7/362* (2013.01); *B67D 7/42* (2013.01); *F01N 3/2066* (2013.01)

(58) Field of Classification Search
USPC ......... 141/59, 198, 285, 289, 290, 297–300, 141/311 R, 312, 348–352, 356, 363, 367, 141/369, 370, 372, 390; 220/86.2, 86.4, 220/746
See application file for complete search history.

(56) References Cited

FOREIGN PATENT DOCUMENTS

| | | |
|---|---|---|
| JP | 3632610 B2 | 3/2005 |
| JP | 2006-123897 A | 5/2006 |
| JP | 2008-213584 A | 9/2008 |
| KR | 10-2005-0016051 A | 2/2005 |
| KR | 10-2012-0051660 A | 5/2012 |
| WO | 2012/100906 A2 | 8/2012 |

\* cited by examiner

UREA FILLER NECK AND UREA TANK FOR PREVENTION OF UREA OVERFLOW AND UREA AFTER-TREATMENT SYSTEM WITH OUTSIDE FILLER NECK

CROSS-REFERENCE TO RELATED APPLICATIONS

This application claims the benefit of priority to Korean Patent Application No. 10-2014-0084292, filed on Jul. 7, 2014, which is incorporated herein by reference in its entirety.

TECHNICAL FIELD

The present disclosure relates to a urea tank, and more particularly, to a urea tank having a urea filler neck capable of preventing an overflow of urea during a pressure increase in the urea tank even when a membrane valve is applied thereto, and a urea after-treatment system having an outside urea filler neck.

BACKGROUND

A urea after-treatment technology is a method of reducing NOx using a reaction formula of $2NO+2CO$ (or $HC) \rightarrow N_2 + 2CO$ by which urea is transformed into ammonia ($NH_3$), and then, the ammonia reacts selectively with NOx through a selective catalytic reduction (SCR) catalyst. The urea after-treatment technology includes a urea tank storing ammonia as the urea which is harmless to humans, a SCR, and an injector for injecting the urea into the SCR.

In recent years, since the exhaust emission standards (for Bin 5) of North America restrict the amount of NOx emission in exhaust gas and particularly restrict vehicles from being driven during exhaustion of urea in the urea tank, it is necessary to periodically replenish the urea.

Typically, replenishment of urea in the urea tank is performed by opening a urea injection port located inside the tank using a trunk room or by opening a urea injection port located outside along with a fuel injection port located. In addition, urea is injected into the urea tank at high speed using a urea injection gun or is injected using a separate urea container.

However, when a membrane valve having a small ventilation rate is applied to the urea tank, the membrane valve has a limit to endure a pressure increase in the urea tank caused by injection of urea. Structural weakness of the membrane valve causes an overflow phenomenon in which urea flowing backward at the end of injection is spouted from the urea injection port via a leveling pipe, resulting in dissatisfaction of a user on injection or replenishment of urea.

When the urea injection port is particularly provided in the trunk room, the overflow of urea through the urea injection port causes contamination of the trunk room, metal corrosion, and ammoniac smell inside the vehicle.

In addition, the urea tank has a relatively small capacity of 25~30 L to 15~20 L on the ground of a reduction in weight and an improvement in layout. However, the small capacity of the urea tank in turn causes urea to be frequently injected. For this reason, it is very important to prevent the urea overflow generated through the urea injection port.

For the prevention of the urea overflow, a roll over valve (ROV) may be applied to a fuel tank, instead of the membrane valve. However, the application of the ROV causes corrosion of urea and crystallization of urea during exposure thereof to the atmosphere. Accordingly, it is difficult to apply the ROV.

SUMMARY

An aspect of the present inventive concept provides a urea filler neck and a urea tank for prevention of a urea overflow and a urea after-treatment system with an outside filler neck, capable of shortening a shut-off reaction time of an injection gun and preventing an overflow of urea through the urea filler neck at the end of urea injection, thus causing a pressure increase in the urea tank by formation of a urea injection path extended, such that a rise of urea flowing backward is delayed, and a buffer space in which the urea flowing backward remains. In particular, an aspect of the present inventive concept provides a urea filler neck and urea tank for prevention of a urea overflow and a urea after-treatment system with an outside filler neck, capable of conveniently injecting urea as in injection of fuel through a fuel injection port by a layout of an outside urea filler neck drawn out of a vehicle.

Other objects and advantages of the present disclosure can be understood by the following description, and become apparent with reference to the embodiments of the present inventive concept. Also, it is obvious to those skilled in the art to which the present disclosure pertains that the objects and advantages of the present disclosure can be realized by the means as claimed and combinations thereof.

In accordance with an embodiment of the present inventive concept, a urea filler neck for prevention of a urea overflow includes a filler housing forming a urea path in which urea flows to a urea tank. An injection gun guide is provided in the filler housing, and an end of an injection gun is fixed by the injection gun guide to limit an insertion position of the injection gun. An injection gun guide flooding phenomenon is generated in which urea flowing backward from the urea tank rises to block an air flow in the filler housing being generated in the injection gun guide. A filler housing pressure increasing phenomenon is generated in which a pressure in the filler housing is increased due to blocking of the air flow by the injection gun guide flooding phenomenon being generated in the injection gun guide. The injection gun is shut-off by detecting a pressure by the filler housing pressure increasing phenomenon in the injection gun guide. An overflow of the urea flowing backward is delayed by a back flow buffering phenomenon in which the urea flowing backward is stored in an inner space of the filler housing in the injection gun guide.

The injection gun guide may include a urea buffer portion which comes into close contact with an inner peripheral portion of a housing body of the filler housing and is formed with a generation space of the back flow buffering phenomenon. A urea injection port is spaced apart from a connection section in which a diameter of the housing body is reduced to a diameter of a housing extension portion such that the housing extension portion connected to the housing body has a change in section, and thus a generation space of the filler housing pressure increasing phenomenon by the injection gun guide flooding phenomenon is formed in the urea injection port and the end of the injection gun is caught by the urea injection port. The housing extension portion may be connected with a urea injection pipe connected to the urea tank.

A side venting line having a hollow pipe shape may be connected to a space formed between an outer peripheral portion of the urea injection port and the inner peripheral portion of the housing body, and the side venting line may be connected with a leveling pipe connected to the urea tank.

The housing body may further include a seal block which comes into close contact with an inner peripheral portion of the housing body to pass through the injection gun, and the seal block may be disposed above the injection gun guide to seal an inlet of the housing body. The seal block may include a magnetic ring and a magnet holder into which the magnetic ring is fitted in the vicinity of the injection gun, and an outer peripheral portion of the magnet holder may come into close contact with the inner peripheral portion of the housing body.

The housing body may further include a urea injection port through which the injection gun passes above the seal block, and the urea injection port may be fitted and coupled to the housing body. The urea injection port may be subjected to attractive force by magnetic force of a magnetic ring inserted into a magnet holder of the seal block.

The housing body may further include a mounting flange to which the urea injection port is fitted and coupled, and the mounting flange may have a drilled mounting hole.

The urea tank may include a membrane valve for regulation of a ventilation rate. A leveling pipe maintains an air flow blocked by the injection gun guide flooding phenomenon in such a manner that the inner space of the filler housing communicates with an inner space of the urea tank body. A urea injection pipe guides the urea discharged from the filler housing to the inner space of the urea tank. A check valve is provided at an outlet portion of the urea injection pipe.

In accordance with another embodiment of the present inventive concept, a urea after-treatment system with an outside filler neck includes a urea filler neck coupled to an outside injection port door exposure to the outside of a vehicle. Urea is injected by opening the outside injection port door. A urea tank includes a urea injection pipe connected to an outlet of the urea filler neck to guide the urea injected into a urea tank body for storing the urea. A leveling pipe connects the urea filler neck to the urea tank body to form an air flow by which an inner space of the urea filler neck communicates with the atmosphere. A urea injector injects the urea into an exhaust pipe, and a selective catalytic reduction removes NOx in exhaust gas.

The urea filler neck may include a filler housing having an inlet into which a urea injection gun is inserted and an outlet through which the urea discharged from the urea injection gun is discharged to the urea injection pipe. A urea injection port is coupled to the inlet of the filler housing. The injection gun is inserted into the urea injection port, and a seal block is disposed beneath the urea injection port so as to seal the inlet of the filler housing. The injection gun passes through the seal block, and an injection gun guide is provided in the filler housing. The injection gun is shut-off due to a pressure increase in the filler housing by urea flowing backward during injection of the urea. An overflow of the urea flowing backward discharged to the inlet of the filler housing is delayed by storing the urea flowing backward in an inner space of the filler housing. A side venting line is drawn from the injection gun guide by which an end of the injection gun is fixed. An inner space is formed by the filler housing and connected with the leveling pipe.

The urea tank may include a check valve provided at an outlet portion of the urea injection pipe, a membrane valve for regulation of a ventilation rate at the urea tank body, a urea detection sensor which detects an amount of the stored urea, and a urea pump which pumps and supplies the stored urea to the urea injector.

DETAILED DESCRIPTION

Exemplary embodiments of the present inventive concept will be described below in more detail with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present inventive concept.

Figure 1:
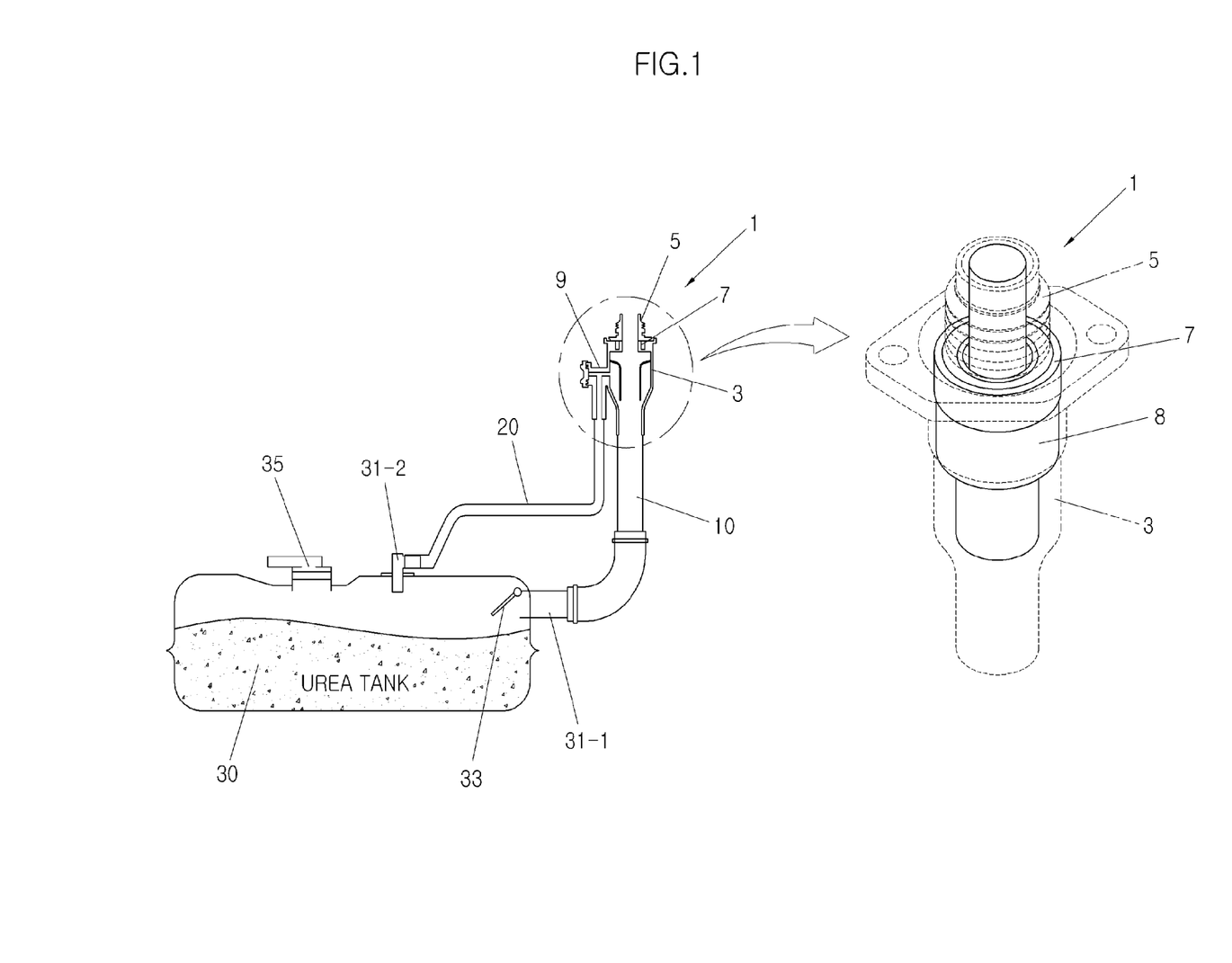
FIG. 1 is a view illustrating a urea tank with a urea filler neck for prevention of a urea overflow according to an embodiment of the present inventive concept.

FIG. 1 shows a urea tank according to an embodiment of the present inventive concept.

As shown in FIG. 1, a urea tank 30 includes a membrane valve 35 provided on a urea tank body for regulating a ventilation rate. A leveling pipe 20 injects urea, such that a pressure in the urea tank body communicates with the atmosphere. A urea injection pipe 10 guides the urea injected from the outside to the urea tank body. A urea filler neck 1 is connected to the leveling pipe 20 and the urea injection pipe 10 in order to release a pressure increase in the urea tank body and to form the atmospheric pressure in the urea tank body when the urea is injected thereto.

The urea tank body determines a urea injection capacity of the urea tank 30. The urea tank body further includes an injection connector 31-1 for connecting the urea injection pipe 10. A venting connector 31-2 connects of the leveling pipe 20. A check valve 33 closes an outlet of the injection connector 31-1, such that the urea in the urea tank body is not ejected through the injection connector 31-1. The urea tank body may further include a urea detection sensor (not shown for the remaining urea.

The urea injection pipe 10 has a hollow shape therein, which connects the injection connector 31-1 to the urea filler neck 1. The urea injection pipe 10 has a straight section formed to some extent from a connection portion of the urea filler neck 1, such that a flow of the urea injected through the urea filler neck 1 is affected by gravity.

The leveling pipe 20 has a hollow shape therein, which connects the venting connector 31-2 to the urea filler neck 1.

The urea filler neck 1 is connected to the urea injection pipe 10 at an end of the straight section into which a urea injection gun (refer to '100-1' in FIG. 3) is inserted in a straight line. The urea filler neck 1 is connected to the leveling pipe 20 at a side of the straight section. Therefore, an inlet of the urea injection pipe 10 forms a right angle with an inlet of the leveling pipe 20.

To this end, the urea filler neck 1 includes a hollow-cylindrical filler housing 3 having a urea discharge port reduced in section. A hollow urea injection port 5 guides the inserted urea injection gun in a straight line. A hollow seal block 7 seals a connection portion between the filler housing 3 and the urea injection port 5. An injection gun guide 8 guides an end of the urea injection gun inserted into the filler housing 3. A side venting line 9 is provided at a side of the filler housing 3 to be perpendicular to the urea discharge port of the filler housing 3.

Figure 2:
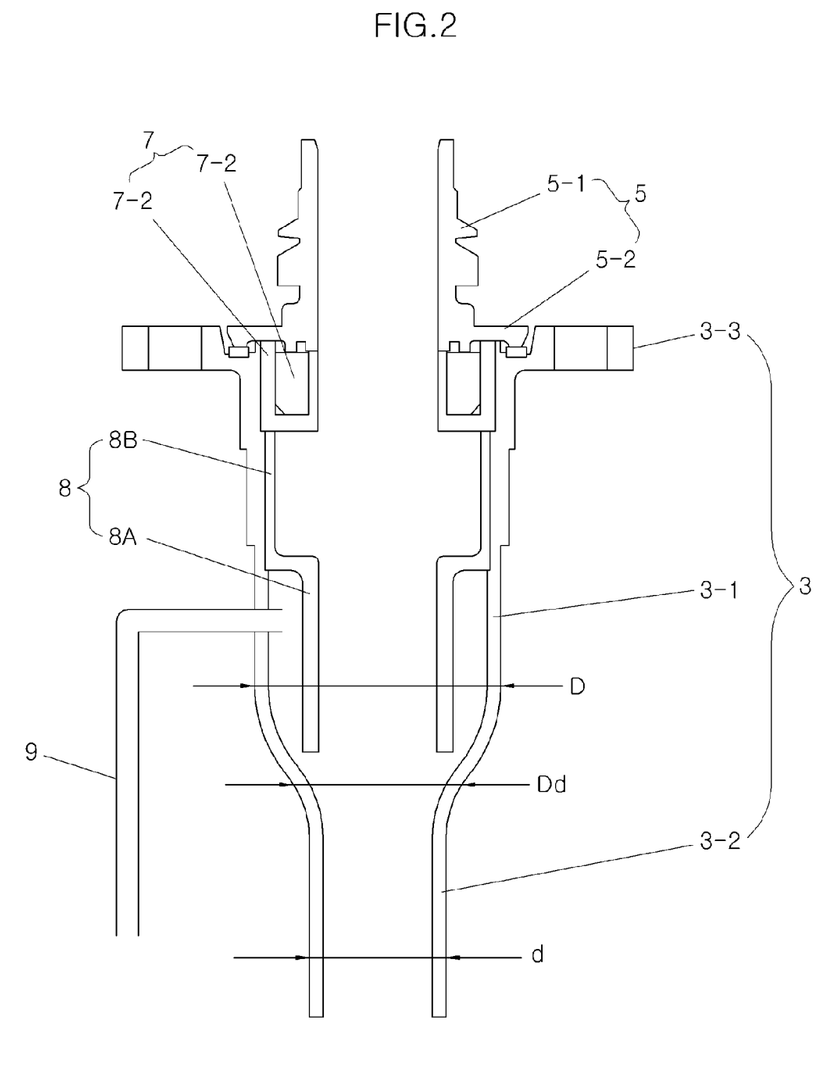
FIG. 2 is a view illustrating a detailed view of the urea filler neck applied for prevention of the urea overflow according to the embodiment of the present inventive concept.

FIG. 2 shows detailed views of the filler housing 3, the urea injection port 5, the seal block 7, the injection gun guide 8, and the side venting line 9.

As shown in FIG. 2, the filler housing 3 includes a hollow-cylindrical housing body 3-1, a hollow-cylindrical housing extension portion 3-2 extending from the housing body 3-1 to have a reduced cross-sectional area compared to a cross-sectional area of the housing body 3-1, and a diamond-shaped mounting flange 3-3 which has bolting holes drilled at opposite sides thereof and is formed at the housing body 3-1 opposite the housing extension portion 3-2. Particularly, an inclined cross-sectional area Dd is formed at a certain section at which the housing body 3-1 having a body cross-sectional area D is gently connected to the housing extension portion 3-2 having a reduced cross-sectional area d. Therefore, the mounting flange 3-3 forms an inlet of the filler housing 3 into which the urea injection gun is inserted, whereas the housing extension portion 322 forms an outlet of the filler housing 3 through which the urea injected by the urea injection gun is discharged. The urea injection pipe 10 of the urea tank 30 is connected to the housing extension portion 3-2.

The urea injection port 5 has a hollow threaded body 5-1 having a thread formed on an outer peripheral surface thereof and a fixed flange 5-2 forming a concentric circle with the threaded body 5-1 to be coupled to the mounting flange 3-3 of the filler housing 3. Particularly, the fixed flange 5-2 is tightly fitted to the mounting flange 3-3 using a groove formed at the mounting flange 3-3 of the filler housing 3, thereby forming a fixation force. However, if necessary, the fixed flange 5-2 may be screwed or bolted to the mounting flange 3-3. Accordingly, the urea injection port 5 is assembled to the filler housing 3 at an inlet portion thereof to be integral with the filler housing 3.

The seal block 7 includes an annular magnetic ring 7-1 as a permanent magnet and a hollow-cylindrical magnet holder 7-2. The magnetic ring 7-1 is fitted into the magnet holder 7-2 and is integral therewith. The magnet holder 7-2 has a circular groove into which the magnetic ring 7-1 is inserted and fitted. An outer peripheral portion of the magnet holder 7-2 is tightly fitted to an inner peripheral portion of the housing body 3-1 of the filler housing 3, and thus, the inlet portion of the filler housing 3 is sealed together with formation of a fixation force. However, if necessary, the magnet holder 7-2 may be screwed into the housing body 3-1. Particularly, the magnetic ring 7-1 pulls the urea injection port 5 by means of magnetic force, and thus, the fixation force of the urea injection port 5 may be further enhanced. Here, the urea injection port 5 is made of a metal material so as to be pulled by the magnetic force. Therefore, the seal block 7 is assembled beneath the urea injection port 5 coupled to the inlet portion of the filler housing 3 so as to be integral in an inner space of the filler housing 3.

The injection gun guide 8 includes a hollow urea injection port 8A and a hollow urea buffer portion 8B connected to the urea injection port 8A.

The injection gun guide 8 has a cross-sectional difference between the urea injection port 8A and the urea buffer portion 8B. For this reason, the urea buffer portion 8B has a larger diameter than that of the urea injection port 8A. For example, the urea buffer portion 8B has an outer diameter sized, such that an outer peripheral portion of the urea buffer portion 8B is tightly fitted to an inner peripheral portion of the housing body 3-1 of the filler housing 3, and thus creating a fixation force. The urea injection port 8A has a larger diameter than an inner diameter of the housing extension portion 3-2 so as not to be inserted into an inner peripheral portion of the housing extension portion 3-2 of the filler housing 3. In addition, the injection gun guide 8 has a length formed so as not to interfere with the side venting line 9 serving as a passage for an increase in pressure in the urea tank 30 and such that a pressure discharged from the side venting line 9 may act toward the housing extension portion 3-2 of the filler housing 3. To this end, the urea buffer portion 8B has a length formed so as not to cover the side venting line 9 in a state assembled to the housing body 3-1 of the filler housing 3, and the urea injection port 8A has a length formed so as to be spaced apart from the housing extension portion 3-2 at the connection section between the housing body 3-1 and the housing extension portion 3-2. Therefore, the injection gun guide 8 is assembled beneath the seal block 7 to be integral in the inner space of the filler housing 3.

The side venting line 9 is drawn to a side of the housing body 3-1 from a space formed by the housing body 3-1 of the filler housing 3 and the urea injection port 8A of the injection gun guide 8, and has a hollow pipe shape. Therefore, the side venting line 9 has an outlet through which the increased pressure in the urea tank 30 is discharged to the housing body 3-1 of the filler housing 3. The leveling pipe 20 of the urea tank 30 is connected to the side venting line 9.

Figure 3:
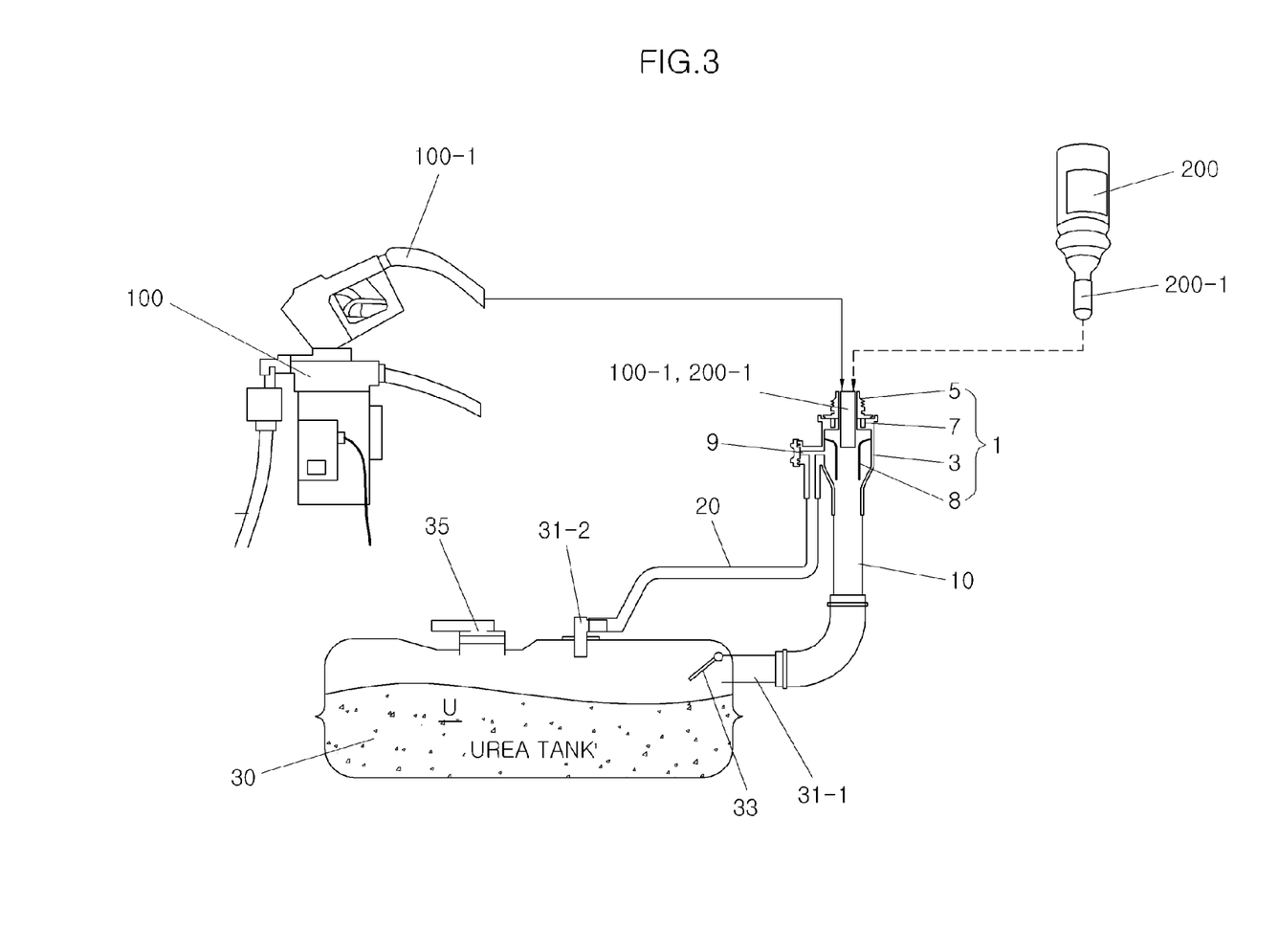
FIG. 3 is a view illustrating a state in which urea is injected into the urea tank using the urea filler neck according to the embodiment of the present inventive concept.

FIG. 3 shows a state in which urea is injected into the urea tank 30 using the urea filler neck 1.

As shown in FIG. 3, the urea filler neck 1 enables urea to be injected using a urea automatic injector 100 or a urea container 200. For example, the injection of the urea using the urea automatic injector 100 may be realized by a simple operation in which an injection gun 100-1 of the urea automatic injector 100 is inserted into the urea injection port 5, pushed to the urea injection port 8A of the injection gun guide 8, and then operated. Alternatively, the injection of the urea using the urea container 200 may be realized by a simple operation in which a container injection port 200-1 of the urea container 200 is located at the urea injection port 5 and the urea container 200 is slightly lifted.

For convenience of description, the urea injected using the urea automatic injector 100 will be described below.

The urea discharged from the urea automatic injector 100 by the operation of the injection gun 100-1 is introduced into the housing extension portion 3-2 of the filler housing 3 via the urea injection port 8A of the injection gun guide 8 coming into contact with an end of the injection gun guide 8. In this case, an outer circumference of the injection gun guide 8 forms a fixed state with the urea injection port 8A of the injection gun guide 8. Accordingly, the injected urea is discharged to the urea injection pipe 10 connected to the filler housing 3 through the housing extension portion 3-2 by gravity. The urea discharged to the urea injection pipe 10 by opening the check valve 33 due to the urea pressure is introduced into the urea tank 30. As a result, the injection of the urea using the urea filler neck 1 is accomplished. In this case, the side venting line 9 forms an air flow within the filler housing 3 so that the urea is smoothly discharged using the injection gun 100-1.

Figure 4:
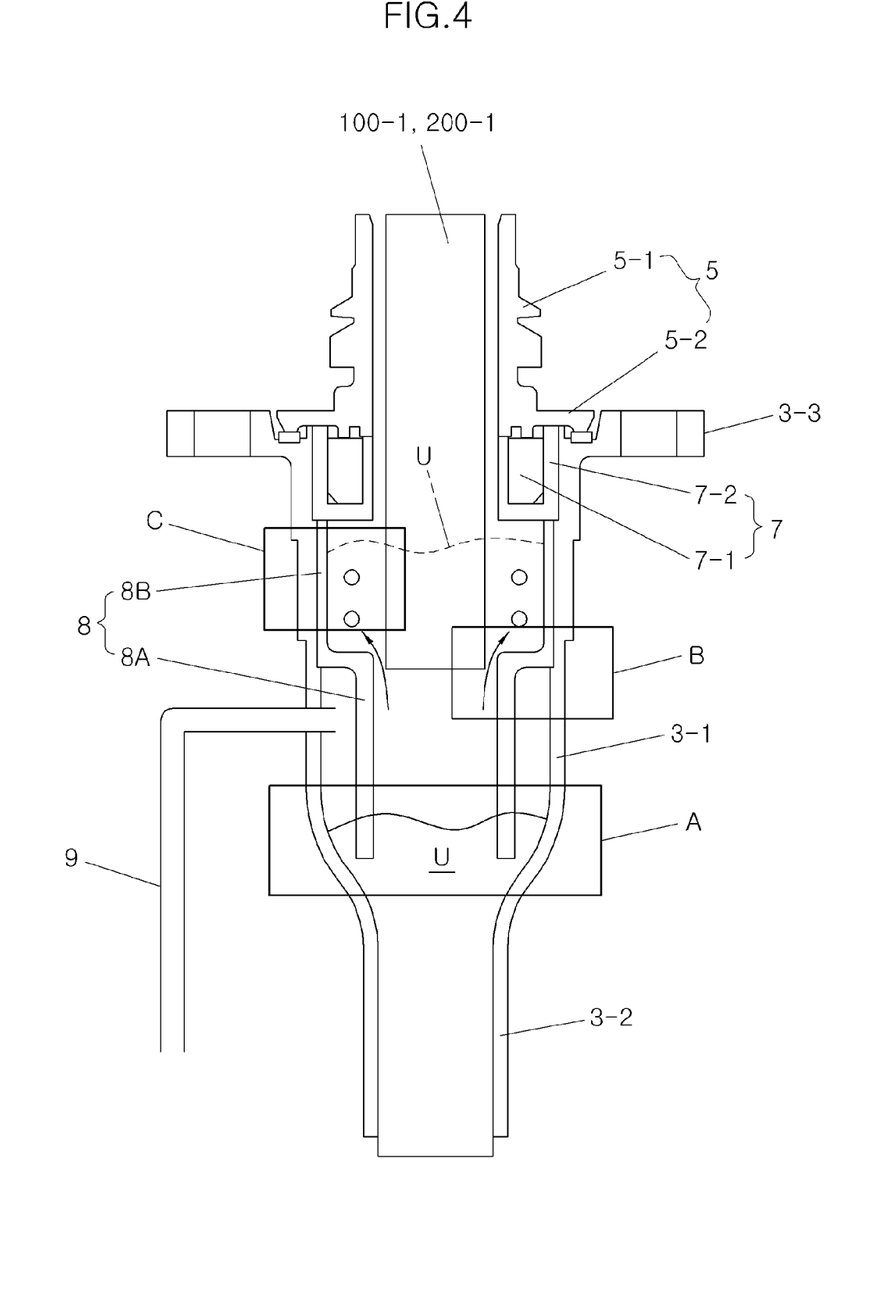
FIG. 4 is a view illustrating a state in which the urea filler neck copes with a back flow of urea caused by an increase in pressure in the urea tank at the end of urea injection according to the embodiment of the present inventive concept.

FIG. 4 shows an operation state of the urea filler neck 1 when the urea flows backward due to a pressure increase in the urea tank 30 at the end of urea injection using the injection gun guide 8.

As shown in FIG. 4, an increase amount of urea in the urea tank 30 increases a pressure in the urea tank 30 at the end of urea injection, and the pressure increase in the urea tank 30 causes the injected urea to flow backward to the housing extension portion 3-2 of the filler housing 3. The back flow of the urea generated during the urea injection is typically exhibited as an overflow by which the urea is discharged to outside, but the urea filler neck 1 prevents the overflow due to the back flow of the urea.

Specifically, when urea flowing backward U rises to the housing extension portion 3-2 of the filler housing 3 and the back flow of the urea proceeds, an injection gun guide flooding phenomenon A is generated in which an end of the urea injection port 8A of the injection gun guide 9 is blocked by the urea flowing backward. The air flow formed by the side venting line 9 and the injection gun 100-1 are blocked by the injection gun guide flooding phenomenon A.

The blocking of the air flow by the injection gun guide flooding phenomenon A brings about a filler housing pressure increasing phenomenon B in which the pressure in the filler housing 3 is increased. The pressure increasing phenomenon B is exhibited as pressure detection by a sensor (omitted because of a typical configuration) of the injection gun 100-1, and shut-off of the injection gun 100-1 proceeds according to a variation in pressure by the detected pressure. Therefore, the urea filler neck 1 changes the back flow of the urea into the shut-off of the injection gun 100-1 so as to prevent continuous injection of the urea by the injection gun 100-1 which causes the urea overflow.

Furthermore, when the back flow of the urea temporarily proceeds after removal of the injection gun 100-1 and thus the urea flowing backward U further rises to the housing extension portion 3-2 of the filler housing 3, a back flow buffering phenomenon C is generated in which the buffer space portion 8B of the injection gun guide 8 is filled with the urea flowing backward U. A time for filling the inside of the filler housing 3 with the urea flowing backward U is delayed by the back flow buffering phenomenon C, such that the overflow of the urea flowing backward U is not immediately generated through the urea filler neck 1 after removal of the injection gun 100-1 by the shut-off.

Figure 5:
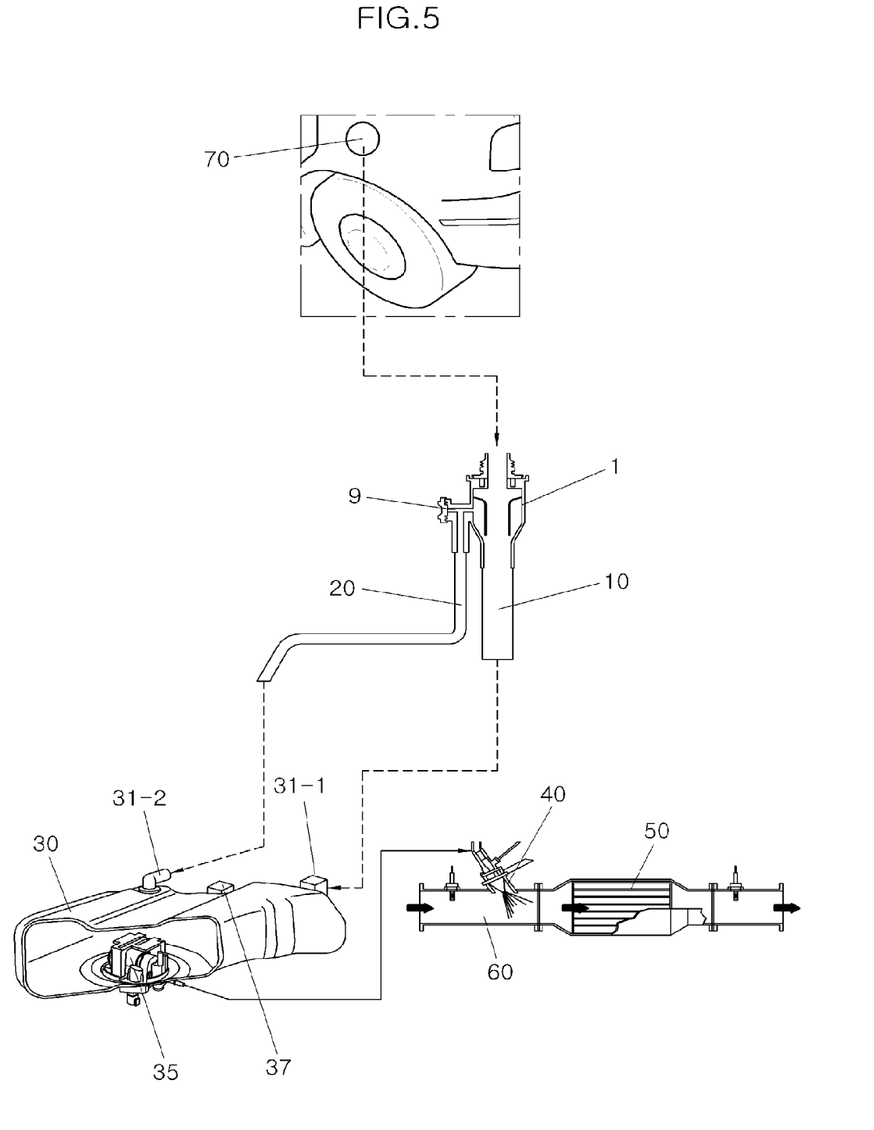
FIG. 5 is a view illustrating an example of a urea after-treatment system in which a urea filler neck for prevention of a urea overflow is configured as an outside type filler neck according to an embodiment of the present inventive concept.

FIG. 5 shows an example of a urea after-treatment system in which the urea filler neck for prevention of a urea overflow according to the present disclosure is an outside urea filler neck.

As shown in FIG. 5, the urea after-treatment system includes a urea tank 30 which stores urea, a urea injector 40 which injects the urea into an exhaust pipe 60, a selective catalytic reduction (SCR) 50 which removes NOx in exhaust gas, and a urea filler neck 1 which is coupled inside an outside injection port door 70 to inject the urea into the urea tank 30.

The urea filler neck 1 includes a filler housing 3 connected with a urea injection pipe 10 connected to the urea tank 30, a urea injection port 5 into which an injection gun for injection of the urea is inserted, a seal block 7, an injection gun guide 8, and a side venting line 9 connected with a leveling pipe 20 connected to the urea tank 30. Such components have the same structures and operations as those of the urea filler neck 1 described in FIGS. 1 to 4.

The urea tank 30 includes a membrane valve 35 for regulating a ventilation rate. The urea injection pipe 10 is connected to the filler housing 3 of the urea filler neck 1, and the leveling pipe 20 is connected to the side venting line 9 of the urea filler neck 1. A urea detection sensor 37 detects the urea of the urea tank 30, and a urea pump (not shown) pumps and supplies the stored urea to the urea injector 40.

The urea injector 40 injects the urea pumped by the urea pump at a front position of the SCR 50 into the exhaust pipe 60. The SCR 50 is installed to the exhaust pipe 60 and removes NOx in exhaust gas by $2NO+2CO$ (or $HC$)$\rightarrow N_2+2CO$ (reaction formula) using the urea injected into the exhaust pipe 60.

Therefore, in the urea after-treatment system, the urea may be injected by a simple and convenient operation in which, when the urea is injected into the urea tank 30, the outside injection port door 70 provided outside the vehicle is opened so that an injection gun 100-1 of a urea automatic injector 100 is inserted into the urea injection port 5 located inside the injection port door 70 or a container injection port 200-1 of a urea container 200 is located at the urea injection port 5 located inside the injection port door 70.

As described above, the urea after-treatment system with an outside filler neck according to the present disclosure includes the urea filler neck 1 provided in the filler housing 3 through which the urea is discharged to the urea tank body forming a storage space of the urea. The injection gun 100-1 is inserted into the inlet of the filler housing being shut-off due to the pressure increase in the filler housing by the urea flowing backward U during the injection of the urea. The overflow of the urea flowing backward U is discharged to the inlet of the filler housing 3 being delayed by storing the urea flowing backward U in the inner space of the filler housing 3. The urea tank 30 is connected to the urea filler neck 1 by the urea injection pipe 10 and the leveling pipe 20. Consequently, it may be possible to shorten a shut-off reaction time of the injection gun and prevent the overflow of the urea at the end of urea injection, and particularly to conveniently inject the urea as in injection of fuel through a fuel injection port by the layout of the outside type urea filler neck drawn out of the vehicle.

In accordance with the exemplary embodiments of the present inventive concept, it is possible to prevent an overflow of urea through a urea filler neck even though the urea flows backward due to a pressure increase in a urea tank at the end of urea injection, by forming a buffer space in which the urea flowing backward to an inner space of the urea filler neck is collected.

In addition, it is possible to shorten a shut-off reaction time of an injection gun at the end of urea injection causing the pressure increase in the urea tank by forming a urea injection path such that a rise of the urea flowing backward to the urea filler neck is delayed.

Furthermore, it is possible to conveniently inject the urea as in injection of fuel through a fuel injection port by an outside urea filler neck drawn out of the vehicle.

While the present inventive concept has been described with respect to the specific embodiments, it will be apparent to those skilled in the art that various changes and modifications may be made without departing from the spirit and scope of the invention as defined in the following claims.

What is claimed is:

1. A urea filler neck for preventing a urea overflow, comprising:
   a filler housing forming a urea path in which injected urea flows to a urea tank; and
   an injection gun guide provided in the filler housing, an end of an injection gun fixed by the injection gun guide to limit an insertion position of the injection gun inserted into an inlet of the filler housing,
   wherein an injection gun guide flooding phenomenon is generated, in which urea flowing backward from the urea tank rises to block an air flow in the filler housing being generated in the injection gun guide,
   a filler housing pressure increasing phenomenon is generated, in which a pressure in the filler housing is increased due to blocking of the air flow by the injection gun guide flooding phenomenon being generated in the injection gun guide,
   the injection gun is shut-off by detecting the pressure in the filler housing pressure increasing phenomenon in the injection gun guide, and
   the area overflow flowing backward is delayed by a back flow buffering phenomenon in which the urea flowing backward is stored in an inner space of the filler housing in the injection gun guide,
   wherein the injection gun guide comprises:
   a urea buffer portion which comes into contact with an inner peripheral portion of a housing body of the filler housing and is formed with a generation space of the back flow buffering phenomenon; and
   a urea injection port spaced apart from a connection section in which a diameter of the housing body is smaller than a diameter of a housing extension portion such that the housing extension portion connected to the housing body has a changing section, so that a generation space of the filler housing pressure increasing phenomenon by the injection gun guide flooding phenomenon is formed in the urea injection port and the end of the injection gun is fixed by the urea injection port, and
   wherein the injection gun guide is assembled to be press-fitted into the inner space of the filler housing.

2. The urea filler neck of claim 1, wherein the housing extension portion is connected with a urea injection pipe connected to the urea tank.

3. The urea filler neck of claim 1, wherein a side venting line having a hollow pipe shape is connected to a space formed between an outer peripheral portion of the urea injection port and the inner peripheral portion of the housing body, and the side venting line is connected with a leveling pipe connected to the urea tank.

4. The urea filler neck of claim 1, wherein the housing body further comprises a seal block which contacts the inner peripheral portion of the housing body to pass through the injection gun, and the seal block is disposed above the injection gun guide to seal an inlet of the housing body.

5. The urea filler neck of claim 4, wherein the seal block comprises a magnetic ring and a magnet holder into which the magnetic ring is fitted in the vicinity of the injection gun, and an outer peripheral portion of the magnet holder comes into close contact with the inner peripheral portion of the housing body.

6. The urea filler neck of claim 4, wherein the injection gun passes above the seal block through the urea injection port which is fitted and coupled to the housing body.

7. The urea filler neck of claim 6, wherein the urea injection port is pulled by a magnetic force of a magnetic ring inserted into a magnet holder of the seal block.

8. The urea filler neck of claim 6, wherein the housing body further comprises a mounting flange to which the urea injection port is fitted and coupled, and the mounting flange has a drilled mounting hole.

* * * * *